United States Patent [19]
Nyman

[11] Patent Number: 5,382,109
[45] Date of Patent: Jan. 17, 1995

[54] COUPLING DEVICE

[75] Inventor: Oscar W. Nyman, El Paso, Tex.

[73] Assignee: The Hammerblow Corporation, Wausau, Wis.

[21] Appl. No.: 921,931

[22] Filed: Jul. 29, 1992

[51] Int. Cl.6 .............................................. F16B 2/02
[52] U.S. Cl. ................... 403/316; 403/330; 403/322; 403/315; 280/512
[58] Field of Search .............. 403/141, 143, 122, 330, 403/322, 315, 316; 280/406.2, 508, 509, 510, 511, 512, 513, 507

[56] References Cited

U.S. PATENT DOCUMENTS

| 1,636,295 | 7/1927 | Dempsey | 280/513 |
| 2,072,473 | 3/1937 | Baumberger | 280/512 |
| 2,204,882 | 6/1940 | Berluti | 280/511 |
| 2,260,442 | 10/1941 | Dollase | 280/33.17 |
| 2,438,749 | 3/1948 | Harrer | 280/511 |
| 2,530,554 | 11/1950 | Tinnerman | 403/122 |
| 3,088,752 | 5/1963 | Dressen | 280/512 |
| 3,374,268 | 3/1968 | Groves | 280/512 |
| 3,433,503 | 3/1969 | Davis | 280/512 |
| 3,893,713 | 7/1975 | Ivy | 280/511 |
| 4,018,453 | 4/1977 | Bigelow | 280/512 |
| 4,283,073 | 8/1981 | Gostomski et al. | 280/508 |
| 4,320,907 | 3/1982 | Eaton | 280/511 |
| 4,388,012 | 6/1983 | Erickson | 403/142 |
| 4,685,695 | 8/1987 | LeVee | 280/423 |
| 4,854,604 | 8/1989 | Stallsworth | 280/511 X |
| 4,958,847 | 9/1990 | Williams | 280/511 X |
| 5,263,735 | 11/1993 | Mann | 280/512 |

FOREIGN PATENT DOCUMENTS 17444 12/1915 United Kingdom ............... 403/143

Primary Examiner—Randolph A. Reese
Assistant Examiner—Harry C. Kim
Attorney, Agent, or Firm—Whyte Hirschboeck Dudek S. C.

[57] ABSTRACT

Interengageable male-female style coupling device with a pivotally movable lock plate having an entrance/egress aperture with a tapered entering surface. The tapered surface both facilitates engagement of coupling members and acts to securely fasten the coupled members in locked position. The device is particularly suited for "gooseneck" or "neckover" coupling devices commonly used in tractor-trailers hauling.

10 Claims, 2 Drawing Sheets

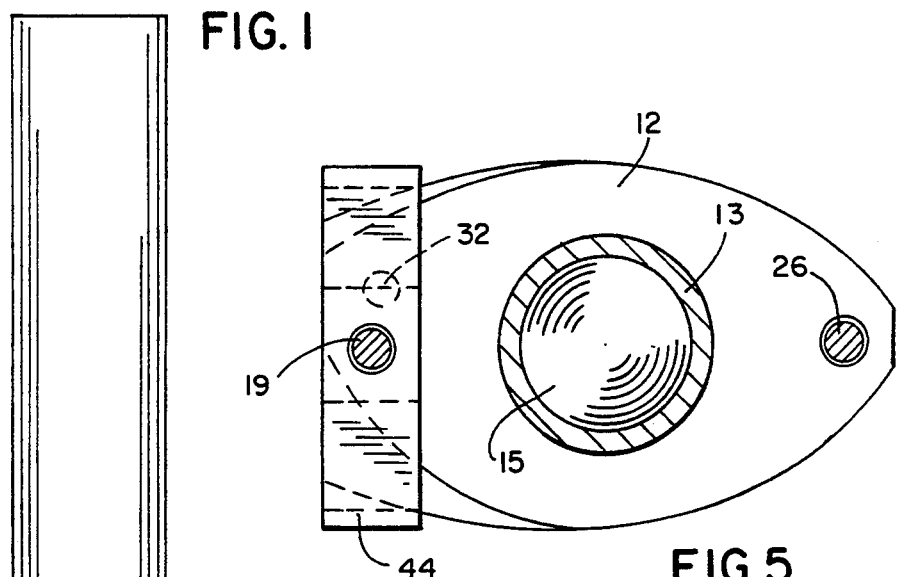
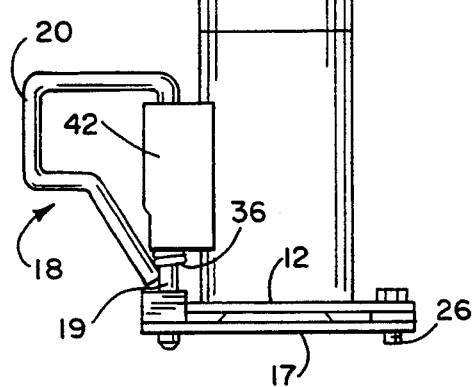
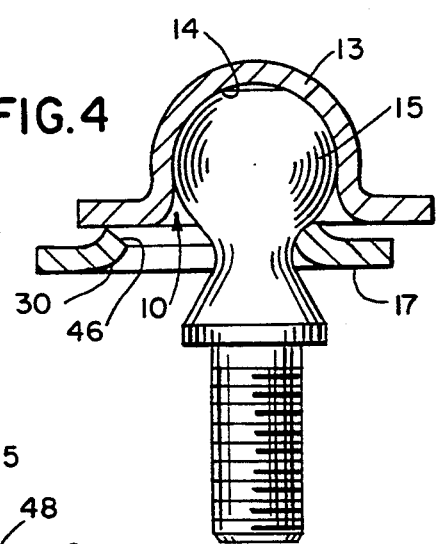
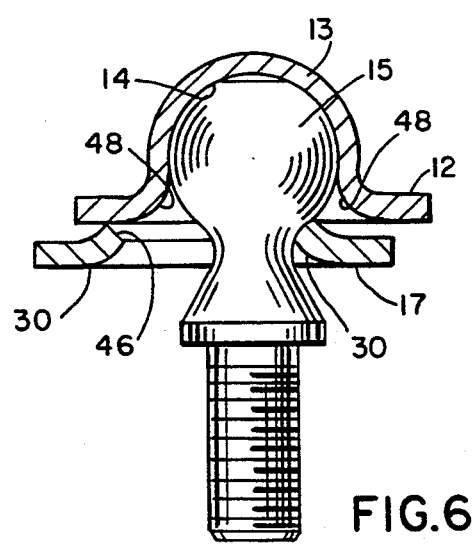

COUPLING DEVICE

BACKGROUND OF THE INVENTION

This invention relates primarily to vehicle trailer hitch assemblies, but also generally to devices which pivotally attach removable structures together. It is believed that the invention has very practical application in pivotally and reliably attaching trailers to hauling tractors or other vehicles. Those familiar with the use of trailer hitches are aware of the difficulty in engaging the spherical ball to the socket receiver of a male-female style trailer hitch. Heretofore, mating the different components of the hitch together required virtually precise alignment prior to engagement. With more massive payloads and towing vehicles, this task became particularly difficult, because maneuverability of the towing structures was diminished. A popular style towing hitch uses a long, vertical sheathing attached to the female portion of the coupler. These hitches are also sometimes known as "gooseneck" or "neckover" couplers. A coupler which assists in engaging these hitches would be of Great utility.

Many currently existing "gooseneck" couplers have multiple moving parts which require continuous lubrication to operate efficiently. In a corrosive environment in which these couplers often operate, the annoyance and hazard of malfunction is exacerbated. A reduction in the number of moving parts would great simplify maintenance and reduce the likelihood of malfunction. Other currently existing devices require machined surfaces, which adds greatly to the cost of manufacture.

SUMMARY OF THE INVENTION

The primary object of this invention is to provide an inexpensive and reliable male-female (ball and socket) style vehicle trailer hitch assembly. Because the device has few moving parts, maintenance and the likelihood of malfunction is at a minimum.

The present invention is an improvement over many existing male-female style trailer hitches because of its extremely simple design and operation. It has minimal construction costs. It requires minimal machining to manufacture. The lock plate prevents separation of the hitch by latitudinally engaging the male section ball in its polar latitudes. This design is an improvement over locking devices which hemispherically engage the ball because it does not require machining of the pivotally engaging locking surface.

The principal advantage of the present invention is to provide a locking element which also facilitates entry of the male component into the female cavity through an inwardly tapered or angled surface at the perimeter of a locking aperture.

In order to enter the socket receiver, the ball must pass through a distended diameter of an aperture in the locking element. The distention increases the effective diameter of the aperture during the engagement process. However when the ball attempts to egress the socket, as might occur during transport, the ball is restrained from such movement by a constricted diameter opening. The constriction decreases the effective diameter during egression of the ball from the socket. The utility of the tapered aperture lies in the use of multiple effective diameters relative to a non-tapered aperture. It is therefore an important object of the present invention to provide a safe and effective trailer coupling device which is a less expensive and much simpler to operate than currently existing coupling devices.

An additional advantage of the present invention is its simple operation. A cooperating lock plate is pivotally displaced from a locked position to an open position by manual manipulation of the plate itself. Avoidance of actuating levers and controls greatly eases its efficient use by operators as well as lowering construction costs to a minimal level.

In an alternative embodiment, the surface of the lock plate immediately adjacent to and terminating at the tapered surface is contoured to conform to the surface of the male component. It will be apparent that this contoured surface more firmly secures the male and female portions of the hitch together.

In yet another embodiment, the opening of the female cavity is tapered in a manner similar to that circumscribing the opening in the lock plate. The purpose of this tapered surface is to assist engagement of the hitch in the event that the openings in the lock plate and the female cavity are not in perfect alignment.

BRIEF DESCRIPTION OF THE DRAWINGS

FIG. 1 is a general elevational view of the invention displaying the preferred embodiment.

FIG. 4 is a fragmentary vertical sectional view taken along line 4—4 of FIG. 2 illustrating a spherical male portion locked into position.

FIG. 5 is a partial cross sectional view taken along the same plane as line 3—3 of FIG. 2 illustrating a spherical male portion in an unlocked position.

FIG. 6 is a partial cross sectional view of an alternative embodiment substantially similar to FIG. 4, except that the opening to the cavity is tapered in a manner similar to the surface circumscribing the opening in the lock plate.

DETAILED DESCRIPTION OF THE DRAWINGS

Figure 2:
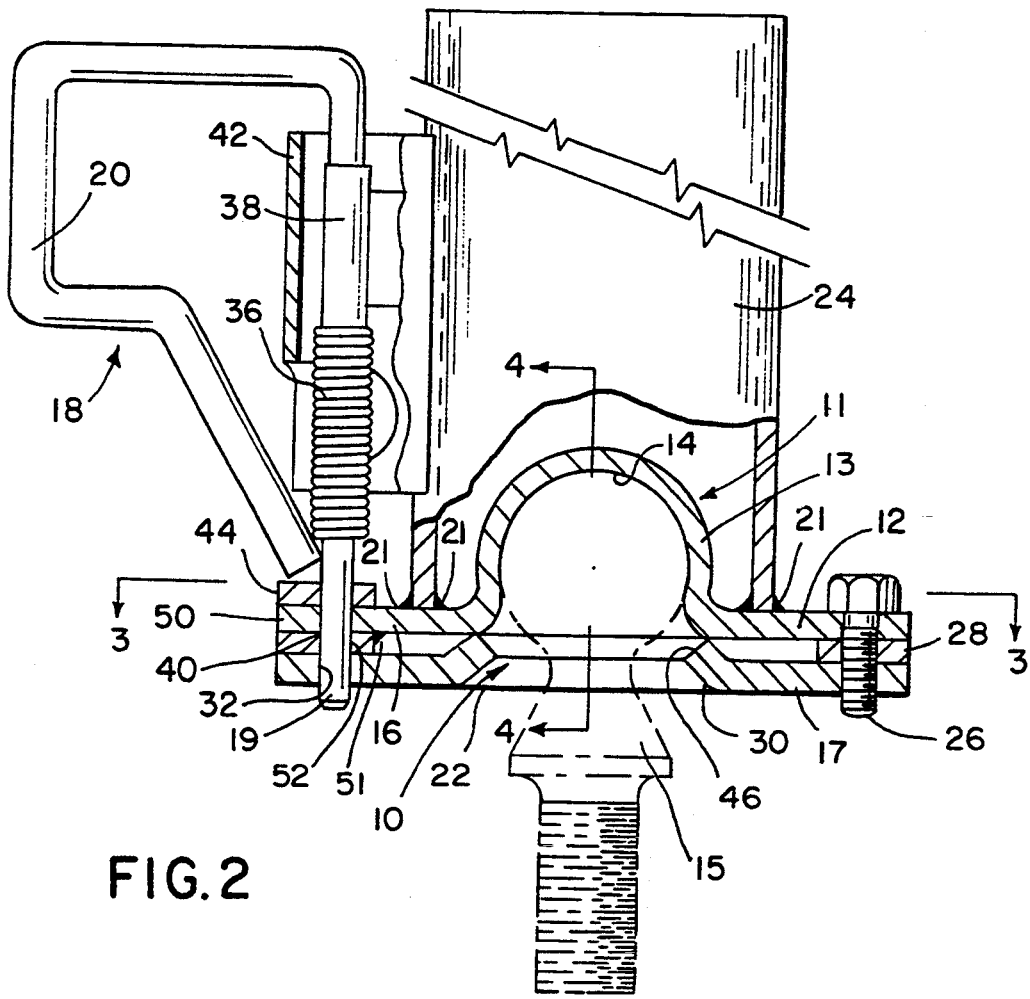
FIG. 2 is a fragmentary elevational view, partly in section, illustrating coupling of the male and female portion, with the lock plate secured into a locked position.

Referring first to FIGS. 1 and 2 of the drawings, there is illustrated a preferred embodiment of the present invention. The coupling arrangement includes a cavernous concave cavity 10 jointly defined by cooperating inner and outer elements. The inner element 11 comprises a stationary plate 12, which is integrally formed to include a dimpled portion 13 defining an internal spherical inner surface 14. The surface 14 substantially conforms to the spherical contour of the distal end of the ball member 15 received therein. The dimpled portion 13 terminates, at its open end at an integrally formed laterally projecting flanged area 16.

A lock plate 17 comprises the outer element and is secured in locking position by means of a one-piece member 18 including a latch pin 19 and a manually operable handle portion 20. Although the preferred embodiment displays the lock plate 17 positioned beneath the inner element 11, the present invention may encompass embodiments wherein their relative positions are inverted. (E.g. a male component located above a female component, with lock plate 17 positioned therebetween). Concomitantly, although the preferred embodiment displays a generally spherical male component or ball member 15 and the generally hemispherical surface 14, it should be understood that the present invention may encompass feasible variations of mating male and female connectors, e.g., polyhedonal, trapezoidal, etc., without departing from the invention described herein.

The dimpled portion 13 is formed in the stationary plate 12 by well known pressing and drawing operations. Attached to plate 12, and circumscribing the concave cavity 10 is a sheathing member 24. The sheathing member 24 should be securely fastened, such as by welding, as indicated by weldments 21. The sheathing member 24 (FIGS. 1 and 2) of the preferred embodiment, is generally tubular and extends vertically away from the mating assembly. The principal function of sheathing member 24 is for support of the trailer or towed structure, and it should be understood that the present invention is not limited to tubular sheathing members. The cylindrical shape of sheathing member 24 shown in FIG. 2 is principally provided to facilitate manufacture. The sheathing member 24 may also be constructed to be capable of telescoping to allow extension and contraction (not shown). The means to accomplish this is well-known. Typically, it can be effected by mating a similar tube of slightly smaller diameter to fit inside sheathing member 24 or, in the alternative, slightly larger to fit outside of sheathing member 24.

The lock plate 17 includes an aperture 22 conforming in diameter with the inner surface 14 of the dimpled portion 13 for reception of the ball member 15 when in coupled relationship.

Referring next primarily to FIG. 2, pivot bolt 26 pivotally supports and connects the lock plate 17 to the flanged portion of the stationary plate 12 extending outside the sheathing member 24. Positioned between the plate 12 and the lock plate 17, through which pivot bolt 26 passes, is a spacer 28. The spacer 28 sufficiently separates the lock plate 17 from plate 12 so as to guard against flattening of the angularly tapered surface 30 at the perimeter of the aperture 22. Another spacer 50 separates plate 12 from the lock plate 17. The spacer 50 is fastened securely to the plate 12 such as by welding, as indicated by weldments 51. The spacer 50 is apertured at 52 sufficiently to allow passage of the latch pin 19.

Figure 3:
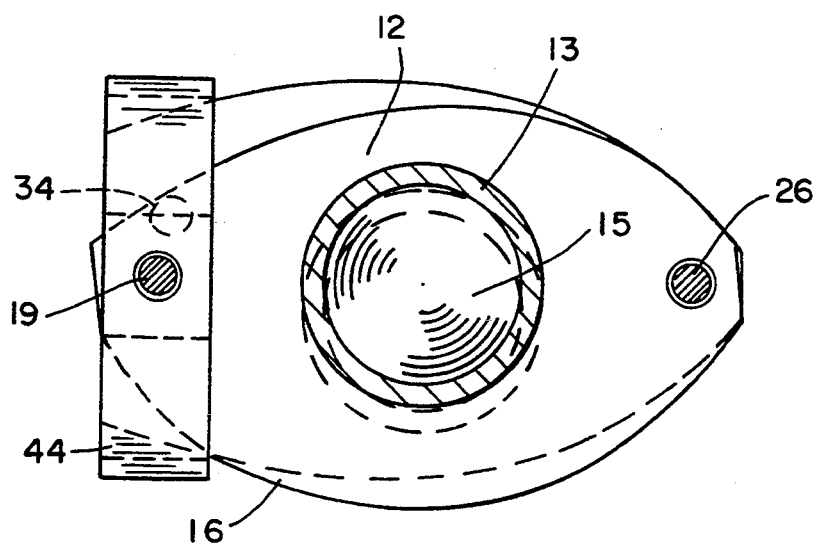
FIG. 3 is a partial cross sectional view taken along line 3—3 in FIG. 2 illustrating a spherical male portion locked into position.

Lock plate 17 is pivotally displaced between open or aligned for receiving the ball member's (FIG. 5) and locked positions (FIG. 3) by rotating with respect to the positioned pivot bolt 26. The lock plate 17 may be secured in the locked position by means of latch pin 19 through manual manipulation of handle member 20. Latch pin 19 is slidably received by an aperture 40 of plate 12, the aperture 52 of spacer 50 and by the aperture 32 of lock plate 17. In an alternative embodiment, lock plate 17 may be secured into an open position, as more clearly seen in FIG. 3, by sliding the latch pin 19 into hole 34 in lock plate 17. The latch pin 19 is biased towards securement with the lock plate 17 by means of compression spring 36 (FIG. 2). Spring 36 biases the latch pin 19 by reacting at one end against the bottom of a stationary tubular guide 38 surrounding the latch pin 19, and, at the opposite end against the flanged area 16 of plate 12. Guide 38 is securely fastened, such as by welding it to the sheathing member 24. The latch pin 19 extends through the aperture 54 in retainer bracket 44, aperture 40 in plate 12, aperture 52 in spacer 50 and aperture 32 in lock plate 17 when the assembly is locked. The latch pin 19 extends through the aperture 54 in the retainer bracket 44, the aperture 40 in the plate 12, the aperture 52 in the spacer 50 and the aperture 34 in the lock plate 17 when the lock plate 17 is aligned with the concave cavity 10 of the plate 12.

The cover plate 42, more clearly seen in FIG. 1 and 2, is fastened to the sheathing member 24 and is formed to enclose the guide 38, the spring 36 and the latch pin 19. Retainer bracket 44 (FIG. 2 and 3) is fastened securely, such as by welding, to lock plate 17, to permit movement of the lock plate 17 between open and locked positions. The retainer bracket 44 is provided with an aperture 54, of sufficient size to allow passage of latch pin 19.

In an alternative embodiment, surface 46 (FIG. 4), of the back plate aperture 22, which is immediately adjacent to inwardly angled tapered surface 30, conforms substantially to the surface of the male component, or ball member 15, in order to provide for tighter and more effective locking engagement.

In yet another embodiment, more clearly seen in FIG. 6, surface 48 at the entrance of the internal surface 14 of the dimple 13 of the plate 12 is tapered in a manner similar to surface 30 of lock plate 17. The additional ramped surface 48 further facilitates engagement of the male and female components by guiding the male member when the opening 22 is not in perfect alignment with concave cavity 10.

What is claimed is:

1. A coupling device for pivotally securing and releasing structure to each other, and comprising:
 a. mating male and female coupling members;
 b. the male coupling member having a generally convex surface;
 c. the female coupling member comprising a concave cavity defined by a stationary inner element and a pivotally supported, apertured, plate-like outer element,
  i. said inner element being provided with an internal cavernous surface portion generally conforming to the convex surface of the male coupling member, said inner element being further provided with an external, outwardly extending flanged area surrounding the cavernous surface portion, and
  ii. said outer element comprising a lock plate of generally planar configuration and defining inner surface and an outer surface, said lock plate including an aperture and being pivotally slidable with respect to the flanged surface said inner element, and wherein said lock plate aperture is normally coaxial with the axis of the cavernous surface portion of said inner element and displacable to a locked position upon pivotal movement of said lock plate, and wherein a defining marginal surface of the lock plate aperture is tapered and is continuous and uninterrupted to provide a constricted area at its inwardly facing surface and being distended at the outwardly facing surface;
   A) wherein entrance of the male coupling member into the concave cavity is facilitated by means of guided initial contact with the distended and tapered lock plate aperture, and
   B) wherein disengagement of the coupled members is prevented by engagement of a said inwardly facing surface of the lock plate with said male coupling member.

2. The device of claim 1 wherein the male coupling member has a reduced cross section intermediate its ends, and the lock plate locks the coupling members by engaging the male coupling member at said reduced cross section.

3. The device of claims 2, wherein the male coupling member is generally spherical.

4. The device of claim 1, wherein there is provided a removable latch pin and both the inner and the outer elements are provided with registerable openings arranged to receive the latch pin when said lock plate is in lock position with respect to said flanged area of the inner element.

5. The device of claim 4 wherein the latch pin is biased into securement of the lock plate with respect to the flanged area of the inner element.

6. The device of claim 1 wherein said tapered marginal surface is contoured at its inner plate surface in relief opposite and corresponding to the contacting surface area of the male coupling member.

7. The device of claim 1 wherein the cavernous surface portion comprises a tapered surface circumscribing the opening of the cavernous surface portion in a manner substantially similar to the tapered marginal surface at the lock plate aperture.

8. In a coupler for a pivotally connecting hitch assembly for coupling at least one moveable structure in combination with a moveable or stationary structure and comprising in combination:

(a) interengagable coupling members comprising a spherical male element and a concave female element;

(b) a lock element movable with respect to the concave female element and displacable to a locking position preventing disengagement of the coupling members, and a latch means for holding the lock element in either said locking or an aligned position;

(c) a mounting structure depending from an end of one of the structures to which the concave female element is secured;

(d) and wherein the mounting structure comprises a tubular or hollow sheathing having a vertical axis, the lock element comprising a rotatable plate pivotally connected to the mounting structure at a pivot axis parallel to the vertical axis and having an aperture through which the male spherical element is insertable into the female concave element;

(e) and wherein the improvement comprises forming the aperture in the lock element with its defining marginal wall being distended and continuous and uninterrupted and tapered angularly inwardly toward the concave female element to provide a ramped surface for receiving the spherical male element.

9. The device of claim 8 wherein an additional improvement comprises a male element contacting surface immediately adjacent to the ramped surface in the aperture which engages the spherical male element and preventing disengagement of the coupled elements.

10. The device of claim 9 wherein the male element contacting surface of said lock element is configured to conform with the mating surface of said male element.

* * * * *

UNITED STATES PATENT AND TRADEMARK OFFICE
CERTIFICATE OF CORRECTION

PATENT NO. : 5,382,109

DATED : January 17, 1995

INVENTOR(S) : Nyman, O.W.

It is certified that error appears in the above-identified patent and that said Letters Patent is hereby corrected as shown below:

Column 4, line 50, after " flanged surface " insert --of--.

Signed and Sealed this

Twenty-sixth Day of March, 1996

Attest:

BRUCE LEHMAN

*Attesting Officer*          *Commissioner of Patents and Trademarks*

UNITED STATES PATENT AND TRADEMARK OFFICE
CERTIFICATE OF CORRECTION

PATENT NO. : 5,382,109
DATED : January 17, 1995
INVENTOR(S) : Nyman, O.W.

It is certified that error appears in the above-indentified patent and that said Letters Patent is hereby corrected as shown below:

Column 4, line 47, after "defining" insert --an--;

Column 4, line 50, after "flanged surface" insert --of--;

Column 4, line 65, delete "a".

Signed and Sealed this

Fifteenth Day of April, 1997

Attest:

BRUCE LEHMAN

Attesting Officer      Commissioner of Patents and Trademarks